United States Patent
Foti et al.

[19]

[11] Patent Number: 5,941,679
[45] Date of Patent: Aug. 24, 1999

[54] AUTOMOTIVE DOOR OPENING ROBOT ASSEMBLY

[75] Inventors: Robert Charles Foti, Fenton; Lupcho Najdovski, Sterling Heights; Stan H. McClosky, Rochester Hills, all of Mich.

[73] Assignee: FANUC Robotics North America, Inc., Rochester Hills, Mich.

[21] Appl. No.: 08/958,276

[22] Filed: Oct. 27, 1997

[51] Int. Cl.$^6$ ...................................................... B66C 1/04
[52] U.S. Cl. ................................. 414/737; 901/29; 901/40
[58] Field of Search ..................................... 414/737, 733; 901/28, 29, 40, 41, 49; 335/285, 286, 295, 306

[56] References Cited

U.S. PATENT DOCUMENTS

| | | |
|---|---|---|
| 4,283,165 | 8/1981 | Vertut ........................................ 414/733 |
| 4,342,536 | 8/1982 | Akeel et al. . |
| 4,423,999 | 1/1984 | Choly . |
| 4,663,602 | 5/1987 | Pignataro ................................. 335/286 |
| 4,688,984 | 8/1987 | Nakashima et al. . |
| 4,693,664 | 9/1987 | Schweiker . |
| 4,702,666 | 10/1987 | Iwao et al. . |
| 4,721,630 | 1/1988 | Takeo et al. . |
| 4,732,241 | 3/1988 | Vachtsevanos et al. ............... 901/29 X |
| 4,739,241 | 4/1988 | Vachtsevanos et al. ................. 318/800 |
| 4,807,486 | 2/1989 | Akeel et al. . |
| 4,860,864 | 8/1989 | Cwycyshyn et al. . |
| 4,946,336 | 8/1990 | Larsson . |
| 4,972,735 | 11/1990 | Torii et al. . |
| 5,062,855 | 11/1991 | Rincoe ................................... 901/40 X |
| 5,192,593 | 3/1993 | Matsuo et al. . |
| 5,286,160 | 2/1994 | Akeel et al. . |
| 5,361,881 | 11/1994 | Simond .................................. 192/56 R |
| 5,577,902 | 11/1996 | Todo et al. ............................. 901/29 X |
| 5,626,216 | 5/1997 | Sperling et al. . |

FOREIGN PATENT DOCUMENTS 0098786  4/1991  Japan .

*Primary Examiner*—Donald W. Underwood
*Attorney, Agent, or Firm*—Howard & Howard

[57] ABSTRACT

A robot assembly (10) for opening and holding an automotive door including a base (12) movably mounted to a platform (14). An inner robot arm (18) is pivotally mounted to the base. An outer robot arm (20) is pivotally mounted to the inner arm (18). A tool arm (22) is pivotally mounted to the outer robot arm (20). The tool arm (22) includes a shaft (58) presenting a second tool arm axis ($A_4$) for rotation about the second tool arm axis ($A_4$). A sphere (90), presenting first, second and third sphere axes ($A_5, A_6, A_7$), is mounted to the distal end of the shaft (58) for rotatably supporting a magnet tool (118). A pin (104) extends from the sphere (90) for preventing the rotation of the tool (118) about the first sphere axis (A) which is parallel to the second tool arm axis ($A_4$). The tool (118) is positioned in a home position relative to the second tool arm axis ($A_4$) by a biasing spring (70) operatively connected to the shaft (58). The tool (118) is positioned in a normal position relative to the second sphere axis ($A_6$) by a pair of biasing springs (110) engaged with the pin (104). The robot arms (18, 20) maneuver the tool (118) such that the tool (118) engages and opens the door. As the tool (118) engages and opens the door, the tool (118) rotates about the second tool arm axis ($A_4$), the second sphere axis (As, and the third sphere axis ($A_7$). The sphere (90) is sealed by a sealing means (112, 114) which accommodates for the rotation of the tool (118). A proximity sensor (74) detects if the tool (118) has hold of the door. The tool arm (22) includes a clutch plate (24) for allowing the tool arm (22) to breakaway from the outer robot arm (20) in the event the tool (118) unexpectedly crashes.

19 Claims, 6 Drawing Sheets

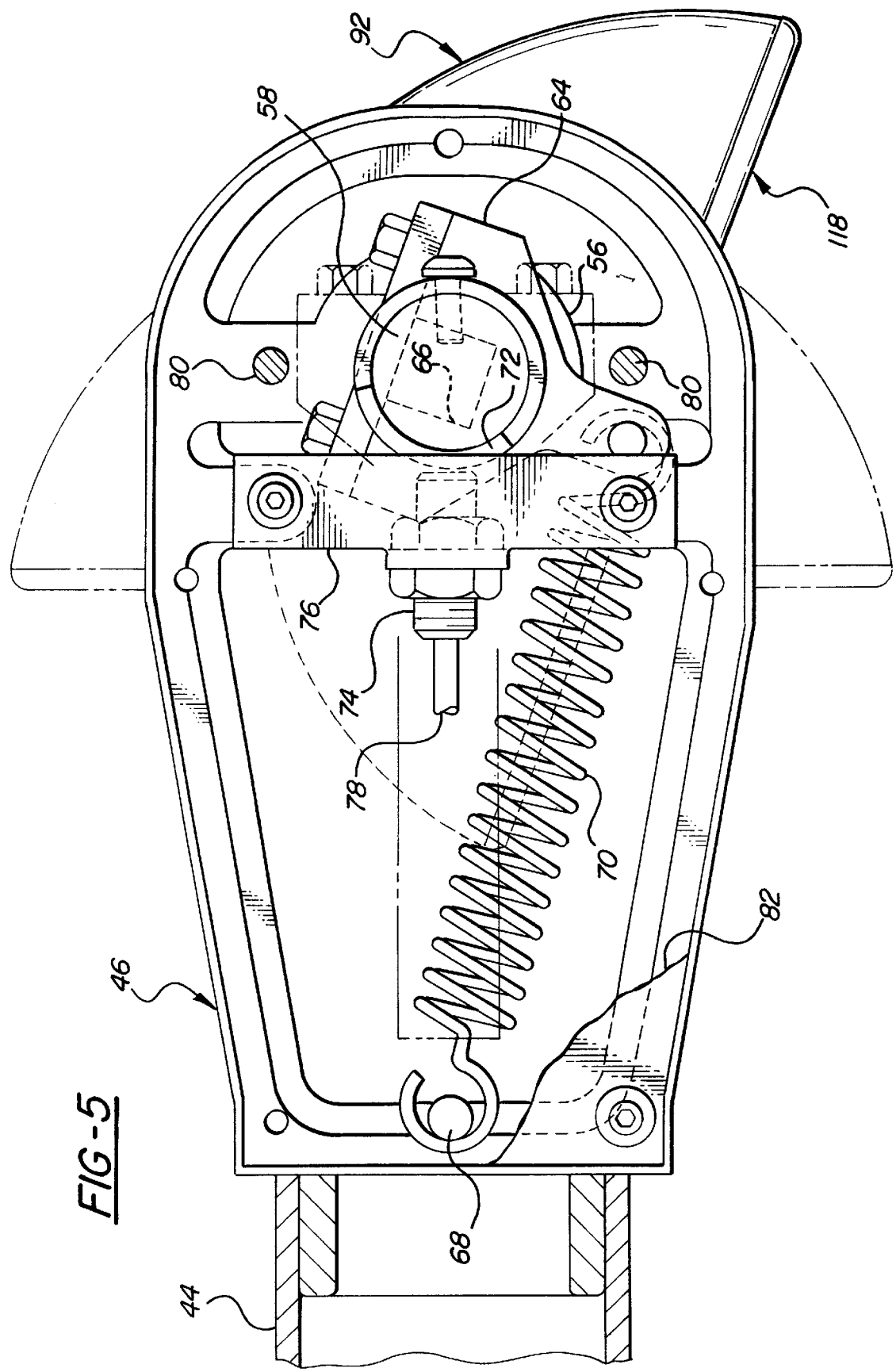

AUTOMOTIVE DOOR OPENING ROBOT ASSEMBLY

BACKGROUND OF THE INVENTION

1. Field of the Invention

The subject invention relates to robot assembly for opening and holding an automotive door.

2. Description of the Prior Art

The typical procedure for robotically painting the interior of an automotive vehicle frame involves robotically moving a door of the vehicle from a closed position to an open position. The door is then robotically held in the open position while the interior is robotically painted. Having painted the interior, the door is robotically returned to the closed position.

Various robotic devices have been proposed by the prior art for opening and holding a door of an automotive vehicle for the purpose of painting the interior of the vehicle frame. Typical of these devices is U.S. Pat. No. 4,342,536 to Akeel. However, these types of devices require a separate fixture to be removably mounted to the door in order for the robot device to grasp and maneuver the door. Accordingly, these devices require additional process time to install and remove the fixture.

Other devices, such as U.S. Pat. No. 5,286,160 to Akeel, do not require a separate fixture to be removably mounted to the vehicle. However, these types of devices require a separate robotic apparatus for moving the door between the closed and open positions, and a separate robotic apparatus for holding the door in the open position. In addition, these devices require end effector servomechanisms in addition to the required robot arm servomechanisms. Thus, these devices are relatively expensive, as well as, require additional time and cost to program.

Thus, there is a need for a robot assembly for opening and holding an automotive door which is relatively inexpensive and reduces the time and cost associated with programming the servomechanisms.

SUMMARY OF THE INVENTION AND ADVANTAGES

A robot assembly for opening and holding an automotive door comprising a base movably mounted to a platform. An inner robot arm is pivotally mounted to a base for movement about an inner arm axis. An outer robot arm is pivotally mounted to the inner arm for movement about an outer arm axis. A tool arm is pivotally mounted to the outer robot arm for movement about a first tool arm axis. The tool arm includes a support housing and a shaft presenting a second tool arm axis. The shaft is rotatably supported by said support housing for rotation about the second tool arm axis. A tool support member and the shaft are interconnected by a sphere disposed in a socket for rotatably supporting the tool support member.

The assembly eliminates the need for servomechanisms to control the positioning of the tool support member or end effector relative to the tool arm.

Accordingly, the subject invention provides a robot assembly for opening and holding a door which is relatively inexpensive and eliminates the time and cost associated with programming end effector servomechanisms.

BRIEF DESCRIPTION OF THE DRAWINGS

Other advantages of the subject invention will be readily appreciated as the same becomes better understood by reference to the following detailed description when considered in connection with the accompanying drawings wherein:

FIG. 5 is a top view of FIG. 4 with the cover partially broken away showing the magnet tool rotated approximately 70° relative to the home position, and showing the magnet tool in the home position in phantom;

DETAILED DESCRIPTION OF THE PREFERRED EMBODIMENT

Figure 1:
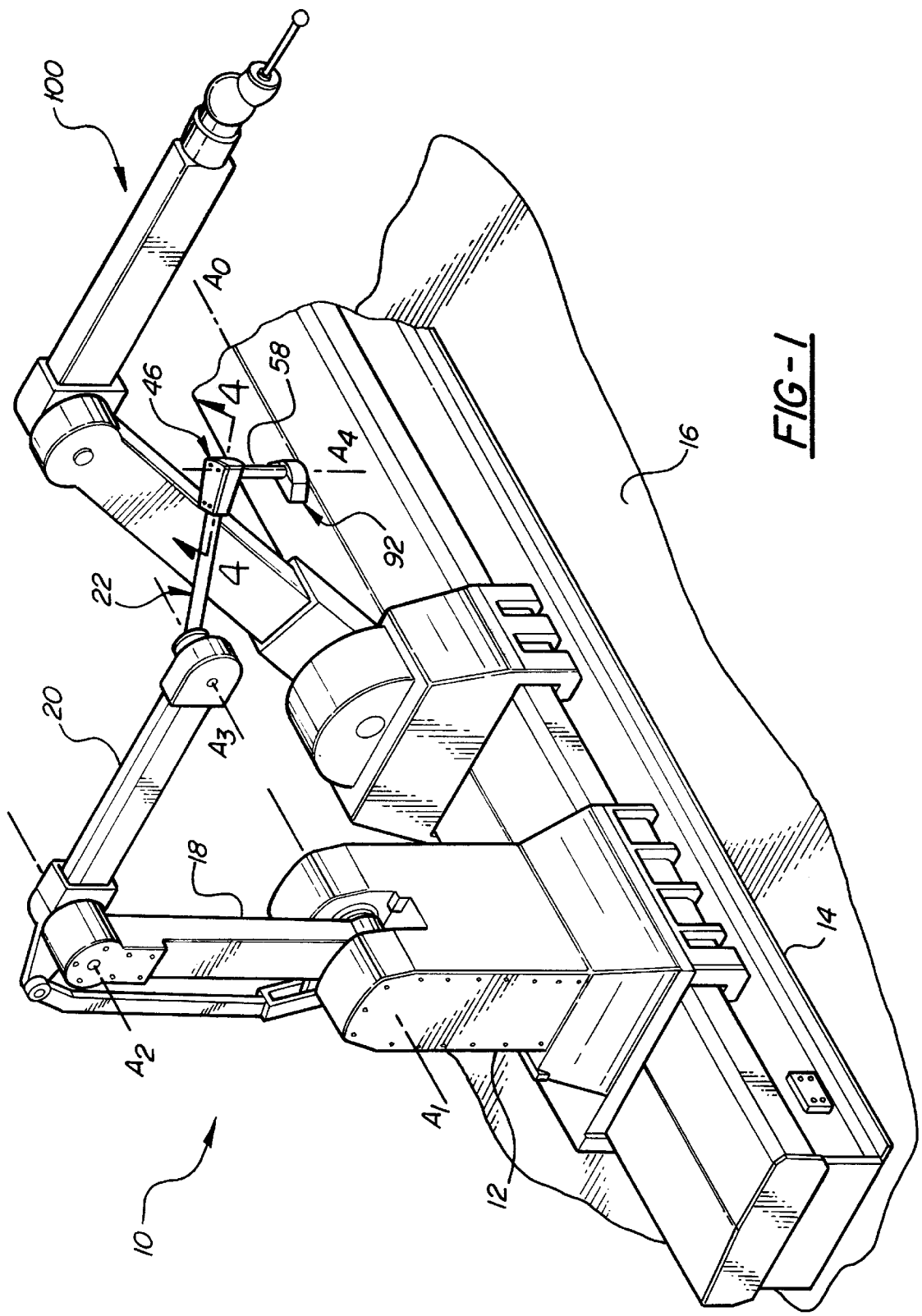
FIG. 1 is a perspective view of the subject robot assembly in relationship to a painting robot.

Referring to the Figures, wherein like numerals indicate like or corresponding parts throughout the several views, a robot assembly for opening and holding an automotive door during a painting operation is generally shown at 10. The assembly 10 includes a base 12. The base 12 is slidably mounted to a platform or rail 14 presenting a rail axis $A_0$ for rectilinear movement relative to the rail axis $A_0$. The rail 14 is secured to a floor 16 or the like. The base 12 is moved in a manner well known in the art. Alternatively, as can be appreciated by one skilled in the art, a base, presenting a generally vertical base axis, could be rotatably mounted to a platform for rotation about the base axis. Consistent with the preferred embodiment, the base in this alternative embodiment is moved in a manner well known in the art.

An inner robot arm 18 is pivotally mounted to the base 12 for movement about an inner robot arm axis $A_1$. An outer robot arm 20 is pivotally mounted to the inner robot arm 18 for movement about an outer robot arm axis $A_2$. The robot arms 18 and 20 are articulated in a manner well known in the art.

Figure 2:
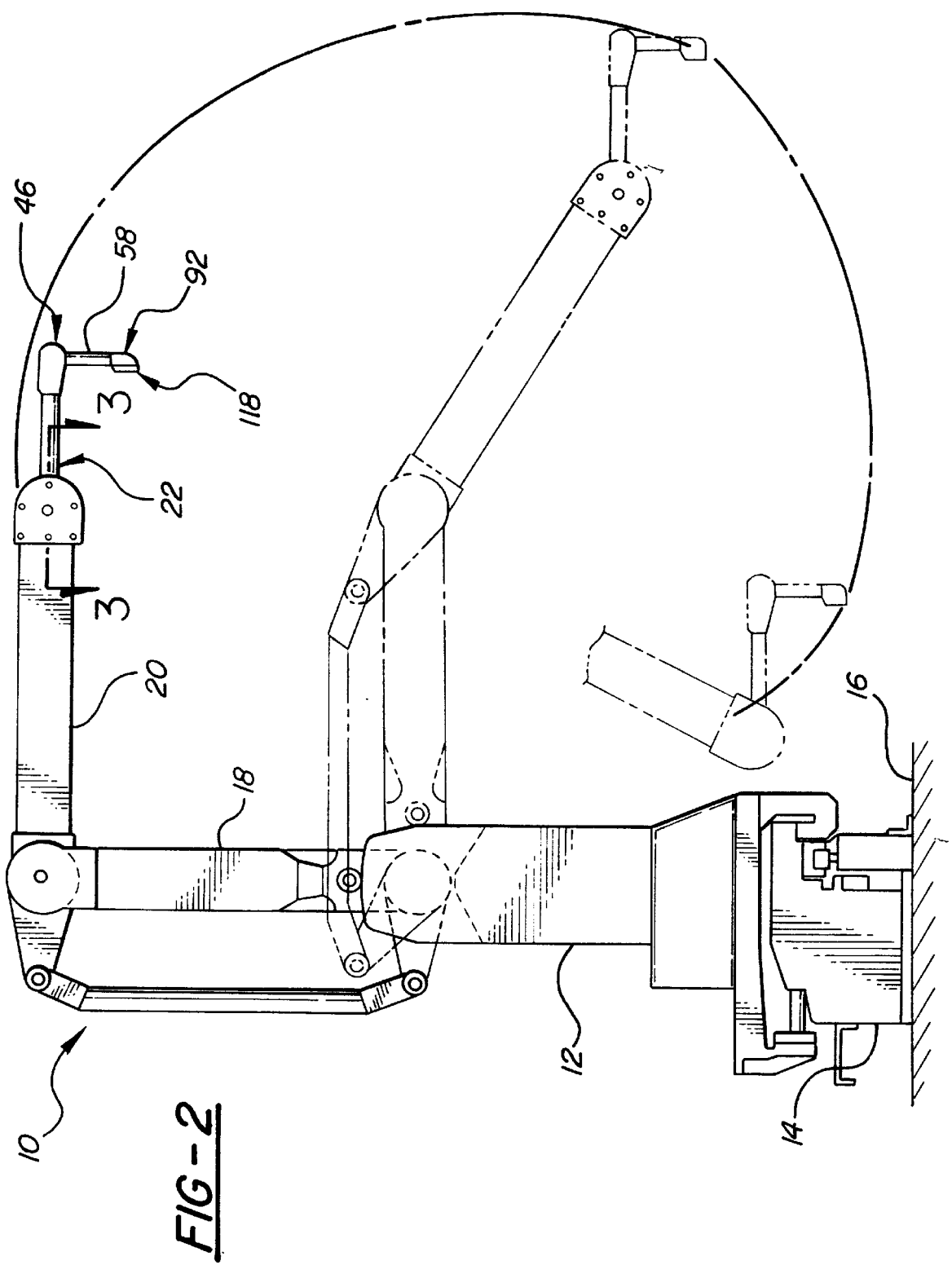
FIG. 2 is an elevation view of the subject robot assembly illustrating the orientation of the tool arm relative to movement of the robot arms.
Figure 3:
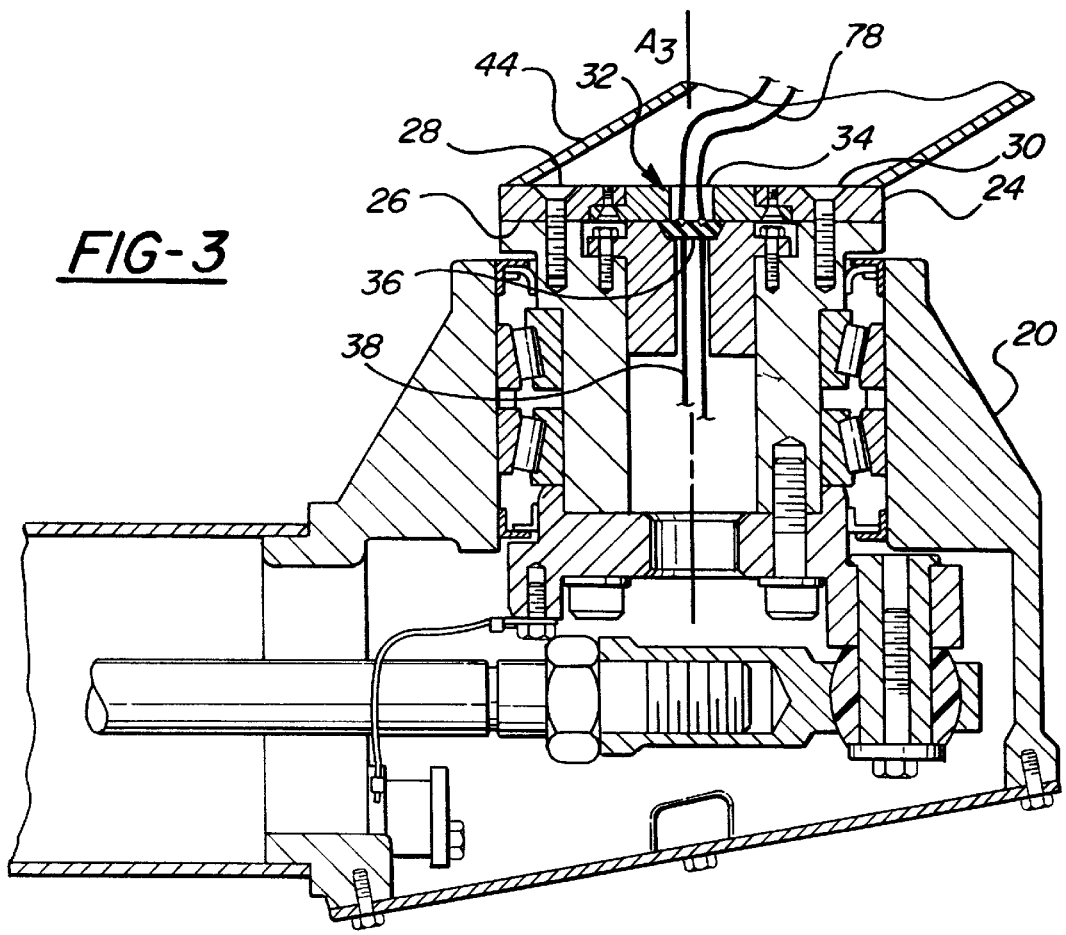
FIG. 3 is a sectional view taken along the line 3—3 of FIG. 2.
Figure 6:
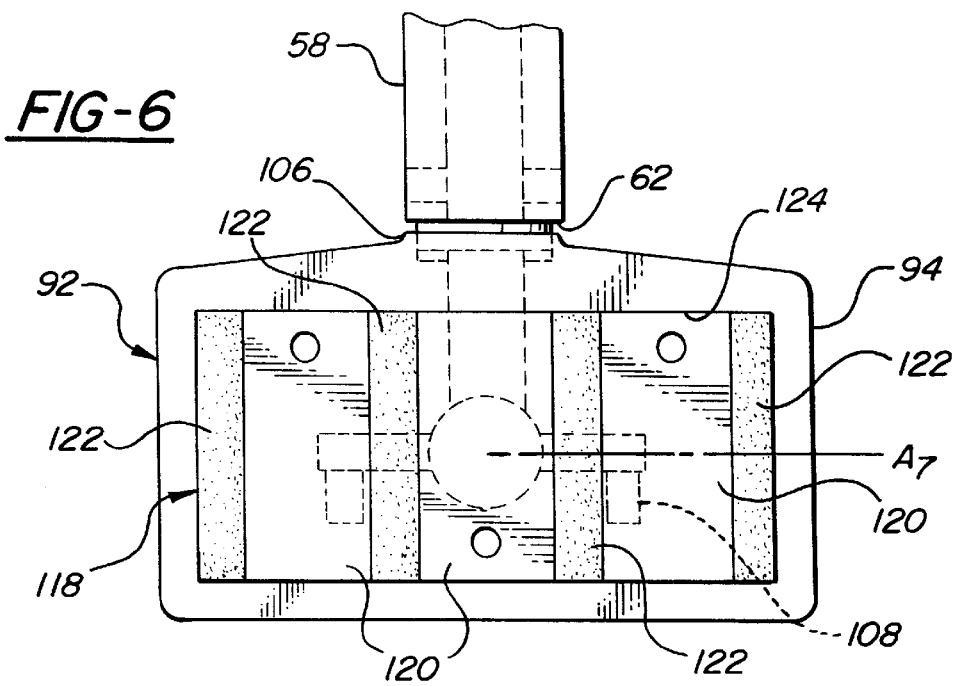
FIG. 6 is view taken along the line 6—6 of FIG. 4.

A tool arm, generally indicated at 22, is pivotally mounted to the outer robot arm 20 for movement about a first tool arm axis $A_3$. As illustrated in FIG. 2, the movement of the tool arm 22 about the first tool arm axis $A_3$ is controlled in a manner well known in the art, and is such that the orientation of the tool arm 22 with respect to the floor 16 is held constant for any articulation of the robot arms 18 and 20.

The tool arm 22 includes a clutch plate 24 having a front face 26 and a rear face 28 opposite the front face 26. The clutch plate 24 is detachably connected to the outer robot arm 20 by multiple nylon screws 30 for disconnecting the tool arm 22 from the outer robot arm 20 in the event the tool arm 22 is subjected to excessive loading. As can be appreciated, the material and size of the screws 30 can vary depending on the load at which the tool arm 22 is desired to breakaway from the outer robot arm 20.

The assembly 10 further includes a tool arm sensing means 32 for sensing when the tool arm 22 is disconnected from the outer robot arm 20. The sensing means is of a type well known in the art, and includes a female electrical connector 34 mounted to the clutch plate 24 and a male electrical connector 36 mounted to the outer robot arm 20. The female connector 36 includes electrical wiring 38 routed through the robot arms 18 and 20. Alternatively, the orientation of the connectors 34 and 36 can be reversed.

A hollow support beam 44 extends from the rear face 28 of the clutch plate 24 at an acute angle relative to the rear face 28 of the clutch plate 24 and is substantially parallel to the floor 16. An L-shaped support housing, generally indicated at 46, is connected to the support beam 44. The support housing 46 includes a guide tube 48 having first 50 and second 52 ends. The guide tube 48 is directed at approximately a 90° angle relative to the support beam 44. As can be appreciated, the optimal orientation of the support beam 44 and/or of the guide tube 48 can vary depending on the given robotic operation to be performed. A frictionless sleeve 54 having a lip 56 is inserted in the tube 48, wherein the lip 56 rests on the first end 50 of the tube 48. A shaft 58 presenting a second tool arm axis $A_4$ is disposed in the tube 48 for rotation about the second tool arm axis $A_4$. First 60 and second 62 ends of the shaft 58 extend outwardly from the first 50 and second 52 ends of the tube 48, respectively. The diameter of the portion of the shaft 58 extending outwardly from the second end 52 of the tube 48 is larger than the opening in the tube 48 preventing the shaft 58 from moving upward relative to the tube 48.

A clevis 64 is bolted around a squared section 66 of the shaft 58, wherein the clevis 64 rests on the lip 56 of the sleeve 54. A post 68 is press fitted into the support housing 46 adjacent to the support beam 44. A biasing spring 70 is operatively connected to the clevis 64 and the post 68 for placing shaft 58 in a home position with respect to the second tool arm axis $A_4$.

A circular proximity tab 72 extends upwardly from the first end 60 of the shaft 58 tracing approximately 120° of the circumference of the shaft 58. A proximity sensor 74 is positioned by a bracket 76 adjacent to the proximity tab 72 for detecting the presence of the proximity tab 72 for providing a signal when the shaft 58 has rotated a specified angular rotation with respect to the home position. The proximity sensor 74 is of a type well known in the art. The proximity tab 72 is located on the shaft 58 such that the leading edge of the proximity tab 72 is directly aligned with the proximity sensor 74 when the shaft is rotated approximately 15° relative to the home position. The proximity sensor 74 and the female connector 34 are interconnected by electrical wiring 78 routed through the support housing 46 and the support beam 44. As can be appreciated, the placement of the proximity tab 72 relative to the shaft 58 can vary depending on the amount of rotation of the shaft 58 at which the proximity sensor 74 is intended to detect the presence of the proximity tab 72.

A pair of stop rods 80 are press fitted in the support housing 46 for engaging the clevis 64 for preventing the shaft 58 from rotating beyond a maximum angular rotation relative to the home position (FIG. 5). In the preferred embodiment, the placement of the stop rods 80 is such that shaft 58 is prevented from rotating beyond plus or minus approximately 80° relative to the home position. As can be appreciated, the placement of the stop rods 80 can be varied so as to vary the maximum angular rotation relative to the home position.

The tool arm 22 further includes a removable cover 82 screwed to the support housing 46 for protecting the components housed within the support housing 46 and for providing access for servicing such components.

The shaft 58 is hollow adjacent to the second end 62 of the shaft 58 and presents an opening 84 therein which extends through the outer diameter of the shaft 58. A stem 86 extends from the second end 62 of the shaft 58 and is secured to the shaft 58 by a pin 88 press fitted in the opening 84 in the shaft 58. A sphere 90 is pressed onto the distal end of the stem 86. Alternatively, the shaft 58 and the stem 86 can machined from a single piece of stock.

The assembly 10 further includes a tool support member, generally indicated at 92, rotatably supported by the sphere 90. The tool support member 92 includes a front plate 94 bolted to a rear plate 96. A front face 97 of the front plate 94 is directed toward the robot arm 18 and 20, and is generally parallel to the robot and first tool arm axes $A_1$, $A_2$ and $A_3$, respectively, when the shaft 58 is in the home position. The inner surfaces of the plates 94 and 96 form a socket 98 and an opening 100 extending from the socket 98. The stem 86 extends through the opening 100 and the sphere 90 is disposed in the socket 98. A cavity 102 extends from opposite sides of the socket 98. A pin 104 extends from opposite sides of the sphere 90. The pin 104 is disposed in the cavity 102 for preventing the rotation of the tool support member 92 about a first sphere axis A. which passes through the center of the sphere 90 parallel to the second tool arm axis $A_4$.

Figure 7:
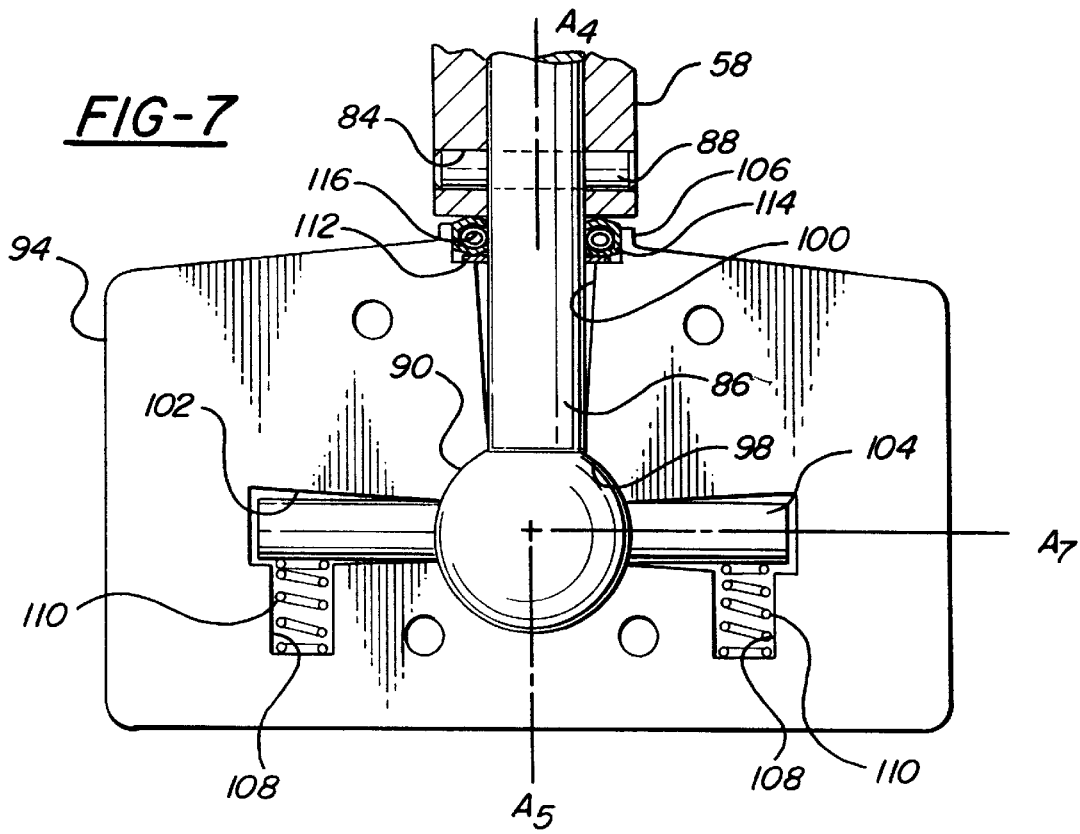
FIG. 7 a rear view of FIG. 6 with the rear plate removed.

The tool support member 92 further includes a collar 106 adjacent to the second end 62 of the shaft 58. As best shown in FIG. 7, clearance is provided between the stem 86 and the opening 100, between the pin 104 and the cavity 102, and between the collar 106 and the second end 62 of the shaft 58 for allowing the tool support member 92 to rotate about the sphere 90 in any direction except for, as discussed above, about the first sphere axis $A_5$. The clearance gap between the collar 106 and the second end 62 of the shaft 58 defines the range in which the tool support member 92 is allowed to rotate about the sphere 90. In other words, the tool support member 92 is prevented from rotating about the sphere 90 beyond the point at which the collar 106 engages the shaft 58. As can be appreciated, the clearance gap between the collar 106 and the shaft 58 can be varied to alter the range in which the tool support member 92 is allowed to rotate about the sphere 90.

Figure 4:
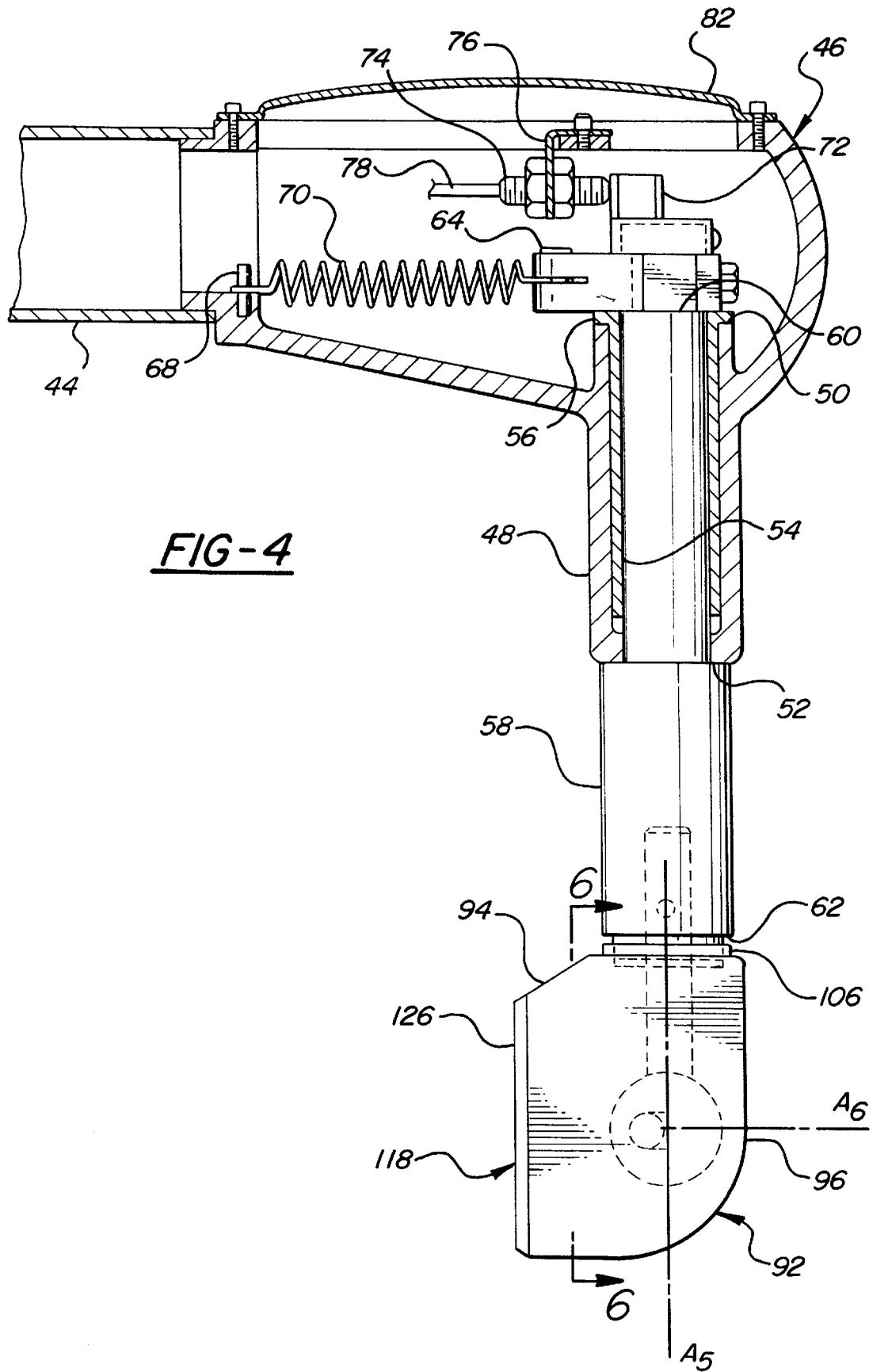
FIG. 4 is a partial sectional view taken along the line 4—4 of FIG. 1.
Figure 8:
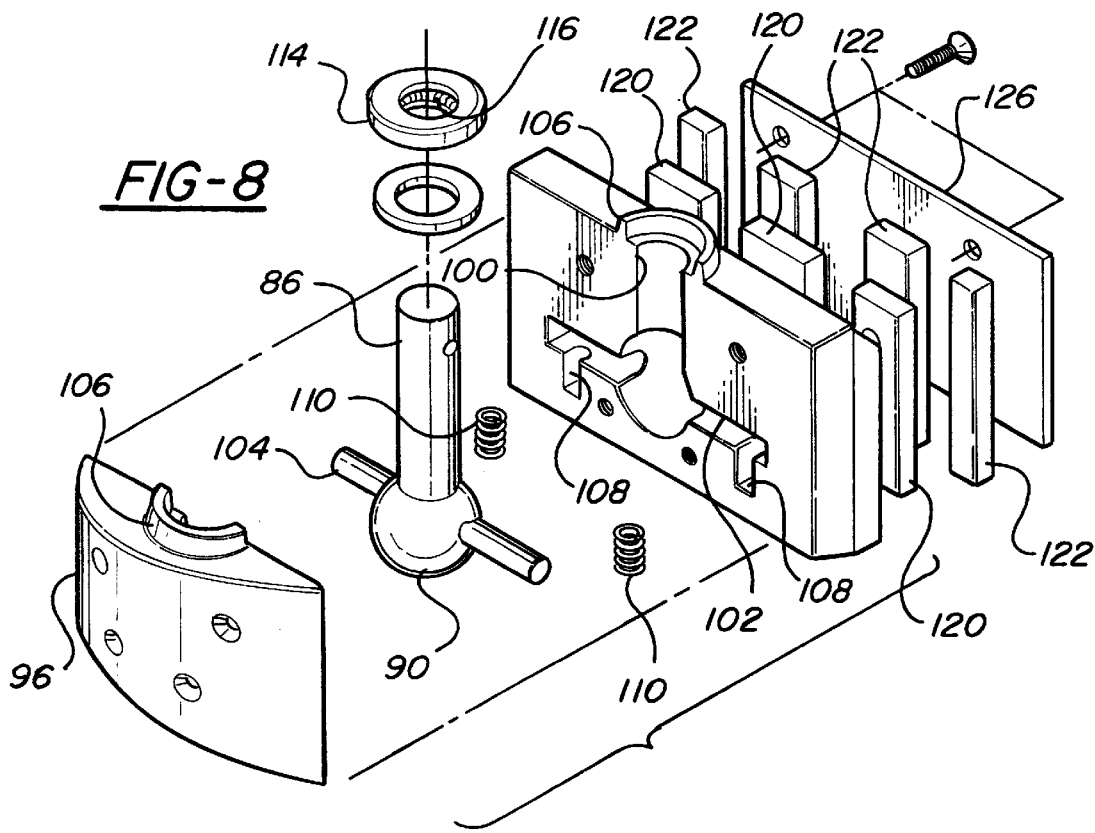
FIG. 8 is an exploded view tool support member and magnet tool.

As best shown in FIGS. 7 and 8, the tool support member 92 further includes a pair of slots 108 on opposite sides of the socket 98 and extending substantially perpendicular to and from the cavity 102. A biasing spring 110 is disposed in each the slots 108 and engages the pin 104. The biasing springs 110 place the tool support member 92 in a normal position with respect to a second sphere axis $A_6$ which passes through the center of the sphere 90 perpendicular to both the pin 104 and the stem 86 (FIG. 4). In addition, the tool support member 92 has a defined normal position with respect to a third sphere axis $A_7$ which passes through the center of the sphere 90 parallel to the pin 104 (FIGS. 4 and 7). In the preferred embodiment, the clearance gap between the collar 106 and the second end 62 of the shaft 58 is such that the range of rotation of the tool support member 92 about each of the second $A_6$ and third $A_7$ sphere axes is plus or minus 2.5° relative to the normal positions of the tool support member 92.

The tool support member 92 further includes a sealing means for sealing the opening 100 and socket 98 (FIG. 7). The sealing means includes a washer 112 and a seal 114 disposed within the collar 106 and around the stem 86, wherein the seal 114 is placed above and adjacent to the washer 112. A spring 116 is disposed in the seal 114 and around the stem 86 for maintaining a force on the washer 112 when the tool support member 92 rotates about the sphere 90. As best shown in FIG. 8, a magnet tool, generally indicated at 118, is supported by the tool support member 92 for opening and holding an automotive door during a given painting operation. The tool 118 includes a plurality of magnets 120 and a plurality of low carbon steel flux bars 122 disposed in a recess 124 on the front face 97 of the front plate 94. The magnets 120 and flux bars 122 are arranged in alternating fashion, whereby each magnet 120 is positioned between two flux bars 122. Additionally, the polarity of the magnets 120 is arranged in a SNNSSN manner. A magnetic cover 126 having a specified thickness is screwed to the front plate 94 so as to cover the recess 124. As can be appreciated, the thickness of the magnetic cover 126 can be varied in order to vary the magnetic holding power of the tool 118.

In operation, the robot arms 18 and 20 are articulated so as to maneuver the tool 118 into an automotive vehicle (not shown) through a window opening of a door and into engagement with an inner panel of the door when the door is in a closed position. Note. Because the tool 118 directly engages the door panel, there is no need for a separate fixture to be removably mounted to the door in order for the tool 118 to take hold of the door. The magnetic attraction between the tool 118 and the panel forces the tool 118 to rotate about the second tool arm, second sphere and third sphere axes $A_4$, $A_6$ and $A_7$, respectively, such that the face of the cover 126 is generally in complete contact with the panel. The rotation of the tool 118 about the second sphere and third sphere axes $A_6$ and $A_7$, respectively, forces the spring 116 disposed in the seal 114 to elastically deform. In turn, the spring 116 forces the washer 112 to maintain the seal to the opening 100 of the tool support member 92. Having engaged the tool 118 and panel, the base 12 and the robot arms 18 and 20 are then articulated so as to force the door to travel to an open position. As the door opens, the tool 118 is again forced to rotate about the second tool arm, second sphere and third sphere axes $A_4$, $A_6$ and $A_7$, respectively. The magnetic holding power of the tool 118 is sufficient to enable the door to be placed in the open position without the tool 118 being displaced relative to the panel. Having opened the door sufficiently to cause the tool 118 to rotate 15° about the second tool arm axis $A_4$, the proximity sensor 74 detects the presence of the proximity tab 72 and provides a signal that the door is present. Conversely, in the event that the tool breaks free from the panel, the biasing spring 70 connected to the clevis 64 forces the tool 118 to return to the home position. In turn, the proximity sensor 74 detects the absence of the proximity tab 72 and signals that the door is absent.

Additionally, in the event that the tool arm 22 or tool 118 collides with an object such that an excessive force is transmitted to the screws 30, the screws 30 will fail allowing the tool arm 22 to breakaway from the outer robot arm 20. In turn, the electrical connectors 34 and 36 disconnect providing a signal that the tool arm 22 has broken free from the outer robot arm 20.

Having moved the door to the open position, the tool 118 holds the door in the open position while a separate painting robot 128 (FIG. 1) performs a painting operation within the vehicle. Having painted the interior of the vehicle, the robot arms 18 and 20 maneuver the tool 118 so as to return the door to the closed position. Having closed the door, the robot arms maneuver the tool 118 away from the panel causing the tool 118 to disengage the panel. Having disengaged the tool 118 and the panel, the biasing spring 70 connected to the clevis 64 forces the tool 118 to return to the home position. At the same time, the biasing springs 110 engaged with the pin 104 force the tool 118 to return to the normal position relative to the second sphere axis $A_6$. Note. It is necessary to place the tool 118 in the normal position relative to the second sphere axis $A_6$ prior to opening the door so that the range of motion of the tool 118 is adequate to accommodate the travel of the door. However, because the magnetic attraction between the tool 118 and the door forces the tool 118 to be properly position relative to the third sphere axis $A_7$ when the tool 118 engages the door, it is not necessary to place the tool 118 in the normal position relative to the third sphere axis $A_7$ prior to opening the door. Finally, the robot arms 18 and 20 maneuver the tool 118 back through the window opening.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A robot assembly (10) comprising:
    a platform (14);
    a base (12) movably mounted to said platform;
    an inner robot arm (18) pivotally mounted to said base (12) for movement about an inner arm axis ($A_1$);
    an outer robot arm (20) pivotally mounted to said inner arm (18) for movement about an outer arm axis ($A_2$);
    a tool arm (22) pivotally mounted to said outer robot arm (20) for movement about a first tool arm axis ($A_3$);
    said tool arm (22) including a support housing (46) and a shaft (58) presenting a second tool arm axis ($A_4$), said shaft (58) being rotatably supported by said support housing (46) for rotation about said second tool arm axis ($A_4$);
    a tool support member (92) mounted to said shaft (58);
    a socket (98) and a sphere (90) disposed in said socket (98) interconnecting said shaft (58) and said tool support member (92) for rotatably supporting said tool support member (92); and
    a cavity (102) and a pin (104) disposed in said cavity (102) interconnecting said shaft (58) and said tool support member (92) for preventing the rotation of said tool support member (92) about said sphere (90) parallel to said second tool arm axis ($A_4$).

2. An assembly as set forth in claim 1 including a biasing spring (110) engaged between said tool support member (92) and said pin (104) for placing said tool support member (92) in a normal position with respect to said pin (104).

3. An assembly as set forth in claim 2 including a pair of said biasing springs (110), said springs (110) being located on opposite sides of said sphere (90).

4. An assembly as set forth in claim 2 including a sealing means (112, 114, 116) for sealing an opening extending from said socket (98).

5. An assembly as set forth in claim 4 wherein said sealing means (112, 114, 116) includes a washer (112) above and adjacent to said socket (98) and a seal (114) above and adjacent to said washer (112).

6. An assembly as set forth in claim 5 including a spring (116) disposed in said seal (114) for applying a force to said washer (112).

7. An assembly as set forth in claim 6 wherein said cavity (102) extends from opposite sides of said socket (98) and said pin (104) extends from opposite sides of said sphere (90).

8. An assembly as set forth in claim 7 wherein said tool support member (92) includes said socket (98) and said shaft (58) includes said sphere (90).

9. An assembly as set forth in claim 8 wherein said shaft (58) extends into said opening.

10. An assembly as set forth in claim 1 including a clevis mounted to said shaft (58) and a biasing spring operatively connected to said clevis and said support housing (46) for placing said tool support member (92) in a home position with respect to said second tool arm axis ($A_4$).

11. An assembly as set forth in claim 10 including a stop rod mounted to said support housing (46) for engaging said clevis for preventing said shaft (58) from rotating beyond a maximum angular rotation with respect to said home position.

12. An assembly as set forth in claim 1 including a proximity tab extending from said shaft (58) and a proximity sensor for detecting the presence of said tab for providing a signal when said tool support member (92) has rotated about said second tool arm axis ($A_4$) a specified angular rotation with respect to said home position.

13. An assembly as set forth in claim 1 wherein said tool arm (22) includes a clutch plate (24) detachably mounted to said outer robot arm (20) for disconnecting said tool arm (22) from said outer robot arm (20) when said tool arm (22) is subjected to excessive loading.

14. An assembly as set forth in claim 13 including multiple screws (30) for detachably mounting said clutch plate (24) to said outer robot arm (20), whereby said screws (30) fail when said tool arm (22) is subjected to excessive loading.

15. An assembly as set forth in claim 13 including a tool arm sensing means (34, 36) for sensing when said tool arm (22) is disconnected from said outer robot arm (20).

16. An assembly as set forth in claim 15 wherein said tool arm sensing means (34, 36) includes a male electrical connector (34) mounted to said clutch plate (24) and a female electrical connector (36) mounted to said outer robot arm (20).

17. An assembly as set forth in claim 1 including a magnet tool (118) supported by said tool support member (92) for engaging and holding a workpiece.

18. An assembly as set forth in claim 17 wherein said tool (118) includes a plurality of magnets (120) and a plurality of flux bars (122), whereby each of said magnets (120) is positioned between two of said flux bars (122).

19. An assembly as set forth in claim 17 wherein said tool (118) includes a magnetic cover (126).

* * * * *